UNITED STATES PATENT OFFICE.

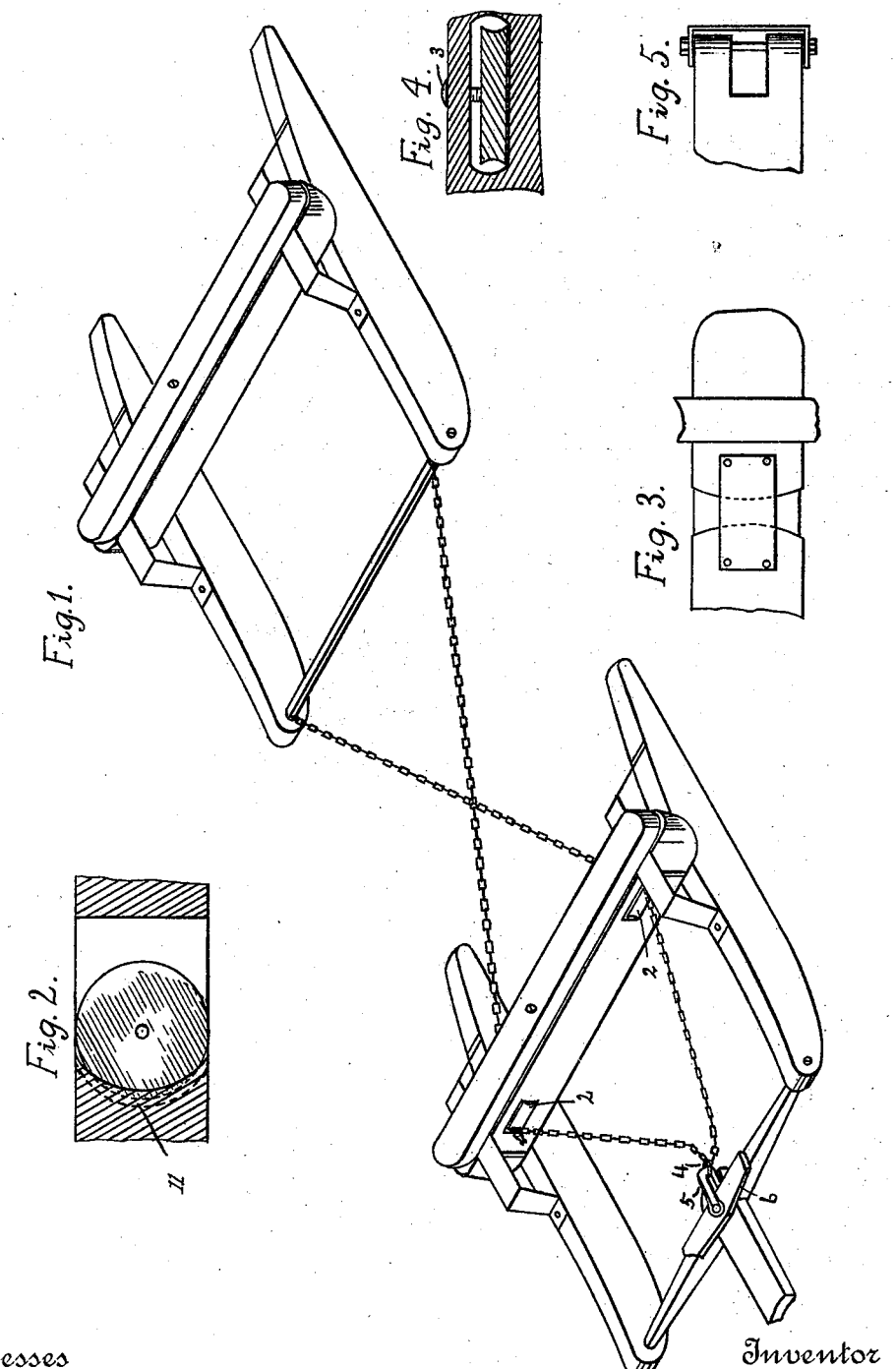

WILLIAM SCOTT, OF CUMBERLAND, WISCONSIN.

SLED.

SPECIFICATION forming part of Letters Patent No. 371,377, dated October 11, 1887.

Application filed March 14, 1887. Serial No. 230,861. (No model.)

*To all whom it may concern:*

Be it known that I, WILLIAM SCOTT, a citizen of the United States, residing at Cumberland, in the county of Barron and State of Wisconsin, have invented certain new and useful Improvements in Sleds; and I do hereby dclare the following to be a full, clear, and exact description of the invention, such as will enable others skilled in the art to which it appertains to make and use the same.

The invention relates to an improvement in logging-sleds, sometimes called "traverse" sleds, which are commonly used for hauling logs and lumber; and its object is to connect two short sleds by chains in such manner that they will "track" or run in the same path, and so that if the rear sled is accidentally thrown out of the track it can be conveniently brought back again and without the necessity of the team's making a detour in the untrodden snow outside of the road; and it also contemplates other advantages incidental to the construction, as will hereinafter appear.

In the accompanying drawings, which form part of this specification, Figure 1 is a perspective view of the sleds connected according to my invention. Fig. 2 is a detail showing a pulley in the beam of the forward sled. Figs. 3, 4, and 5 also exhibit details.

The sleds are represented as having each a single beam, which is a usual construction; but the invention is applicable to those having two or even more beams. Other parts of the construction are of the usual form and clearly shown in the drawings, and need not be particularly described, except in their relation to the present improvement. The tongue or short pole, usually attached rigidly to the roller of the rear sled and by a clevis or otherwise to the beam of the forward sled, is dispensed with, and the sleds are connected by chains, which are secured in any convenient manner to the roller of the rear sled near the runners. A convenient mode of securing them is by means of rings or links placed upon the gudgeons that hold the roller in the runners. These rings or links might be fastened to or placed on the gudgeons, either on the outside or inside of the runner, or secured to the body of the roller near its end, or the chains might be fastened by staples or other devices, or they could be attached directly to the front end or nose of each runner. From the rear sled the chains extend diagonally, and so as to cross each other to the beam of the fore sled, and run around pulleys 2, placed horizontally in slots near the ends of said beams, vertical axes for the same being provided by bolts 3, as indicated in the drawings.

In Fig. 2 is illustrated a modification of the slot adapted to keep the chain in the groove of the pulley. This slot has an extension, 11, made in a curve to correspond with the curve of the pulley into which the latter projects with the effect of preventing the chain from dropping down and becoming locked between the edge of the pulley and the wall of the slot. These pulleys might be omitted and suitable chains passed through slots in the beam, the inner wall of said slots toward the center of the beam being curved outwardly to facilitate the slipping of the chains through them, as indicated at Fig. 3; or said slots might be formed in the upper or lower surface of the beam or in its end, as represented in Figs. 3 and 5.

From the beam of the fore sled the chains run forward to the front roller near the pole, where they are secured to a ring or link, 4, by means of which they are connected to a doubletree or evener, 6, which latter may be used with or without singletrees, as desired. The ring or link described above can be connected to the evener or doubletree by a clevis, 5, or in any well-known manner, or it can be dispensed with and a clevis alone used. The pole-team pulls the rear sled directly by means of the chains, and the leaders pull the fore sled directly from the front end of the pole. Usual means may be provided for securing whiffletrees direct to the sled-runners, if desired, for occasional use. On a descending grade, or when the pole-team is holding back, the weight of chains tends to pull the doubletree back from the horses' heels.

Obviously, the draft-chains can be shortened or lengthened, as desired, for hauling logs of various lengths, and the chains can also be easily varied in length to suit teams of different sizes which it may be convenient to hitch at the pole. If necessary, the chains can be provided at intervals with links of special form, as is customary, to enable the length of the chain to be varied for any purpose in a well-known manner. Thus, when it is desired that the rear sled be thrown out of the track to pass around a stub or other obstruction, either chain can be readily shortened, so that it will draw the rear sled sidewise or obliquely to pass around the obstacle. Relatively shortening the other chain tends to bring the sled back to the road.

From the foregoing description it will be readily understood that the connected sleds are, as a whole, more flexible and easy of movement than if they were joined by a rigid tongue in the usual manner. The movement of the fore part of the rear sled up and down, as in pasing over knolls, is more free, not being restricted by a pole. Movements in a lateral direction also are less restricted. This permits the rear sled to run freely over and around obstacles and unevenesses in the road, while the motion of the bolsters or rockers, both being pivotally connected with the beams, prevents the load supported on them from interfering with the easy movements of the sleds, and when, by accident or otherwise, the rear sled is turned out of the track into the untrodden snow the length of the chains can be easily adjusted at the front without the driver's getting out into the snow, so that the team, pulling directly from the nose of the sled, can draw it back into the road; whereas, if the sleds were connected by a pole, the rear one could only be moved through the medium of the fore sled and short tongue, which latter, being rigidly connected to the center of the roller, acts less efficiently to turn the sled than a chain connected near the runner. These short tongues are, moreover, very liable to be broken or to be disconnected from the roller. It may be added that a greater distance must be traversed by the fore sled and short tongue to bring the rear sled into its normal position, when once thrown out, than by my construction, by which the pole-team draws directly from the runner-nose. This latter feature also provides for easily starting the rear as well as the fore sled when they have been frozen to the track. To facilitate starting, it is customary to leave the sleds turned a little sidewise of the track, so that the first pull of the team will be exerted transversely to the runners and free them from the frost; and, under ordinary conditions, my sled can be more easily started, since the pole-team is connected directly to the rear sled; and as ordinarily a team can draw, when started, a heavier load than they can start, this is an important result, and my experience has demonstrated that from five to ten hundred feet more can be drawn by the same team on my improved sled than on one of ordinary construction.

My construction also provides for turning around within smaller space than in the use of the old form, where the turning movement of the fore sled is limited by a tongue-connection with the rear one. The sleds can readily be disconnected by unhitching the chains and then pulling them through the beam; or they may be detached at the rear sled. This would allow the sleds to be turned almost in their tracks.

Horses are comparatively helpless in deep snow, as they founder and jump therein, and are generally impatient of the situation. They are therefore very liable to injure themselves, particularly if sharp-shod. My invention affords the means of controlling the rear sled, as described, by manipulating the chains, which are accessible from the truck, and returning it to its proper direction by horse-power without taking the team from the beaten track for this purpose.

Logging-roads are frequently made between five and six feet wide, and the sleds are correspondingly wide; but my improvement is not limited to any particular width or style of sled, but only to the features hereinafter particularly pointed out.

In loading, it is desirable that the chains be prevented from being drawn through the slots in the beam, and it is also important to prevent the fore sled from slipping backward so as to draw the pole from the neck-yoke. Pins, bolts, or "jew's-harp links" are inserted through links of the chains in proper position near the fore-sled beam, and obviate the evils referred to. Before moving the loaded sleds these links or other fastening devices are removed, so that the chains may play freely through the slots; and it may be noted that the drawing of a chain back through a slot by the turning of a rear sled out on the opposite side is at once counteracted, ordinarily, by the draft on the chain, so that the sled cannot ordinarily run out of the track.

Heretofore two sleds have been connected by chains which were secured to the rear end of the fore sled, crossed, and then secured to the rear sled, said sleds being also connected by a short tongue, and I do not broadly claim joining two sleds by means of crossed chains.

Having thus described my invention, what I desire to claim and secure by Letters Patent is—

1. The combination of the two sleds, the chains secured to the rear one, crossed, and passed through slots in a beam of the fore sled, and means for hitching a team to the same near the roller of the fore sled, substantially as set forth.

2. The combination of the sleds, the chains secured to the rear one, crossed, and extended through slots in a beam of the fore sled, and provided near the beam of the fore sled with removable pins, and an evener or singletree connected to said chains near the roller, as set forth.

3. The combination of the two sleds having each a pivoted rocker or bolster, the two chains each secured near the nose of a runner, crossed, and extended through a slot in a beam of the fore sled, said beam having therein slots and grooved pulleys, and means for attaching a team to the chains, all substantially as specified.

4. The combination of the two sleds, the two crossed chains secured to the rear sled near the fore ends of the runners and passed through slots in a beam of the fore sled, provided with grooved pulleys, said slots being curved, as described, to prevent the chains from leaving the pulley-grooves, and means for connecting a team to said chains, substantially as set forth.

5. The combination of two sleds, chains attached to the fore part of the rear sled and crossed between the sleds, a support for the chains at the beam of the fore sled, and means for attaching a team to the chains at or near the roller of the fore sled, substantially as set forth, whereby by means of direct draft from a team the rear sled can be moved out of the track to avoid an obstacle or returned to it upon suitably adjusting the length of the chains.

In testimony whereof I affix my signature in presence of two witnesses.

WILLIAM SCOTT.

Witnesses:
H. S. COMSTOCK,
C. F. KALK.